C. BEARENS.
RESILIENT DRIVE MEANS.
APPLICATION FILED APR. 30, 1920.
1,360,867.
Patented Nov. 30, 1920.
2 SHEETS—SHEET 2.
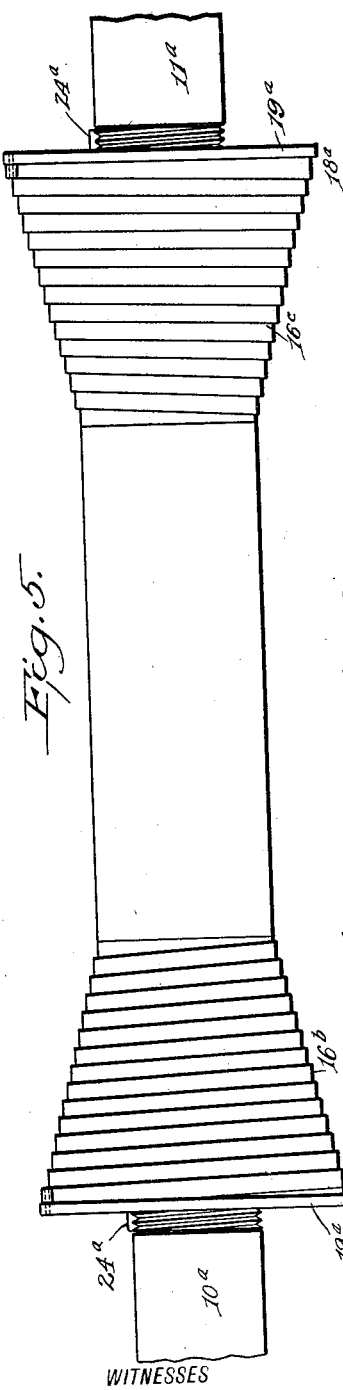
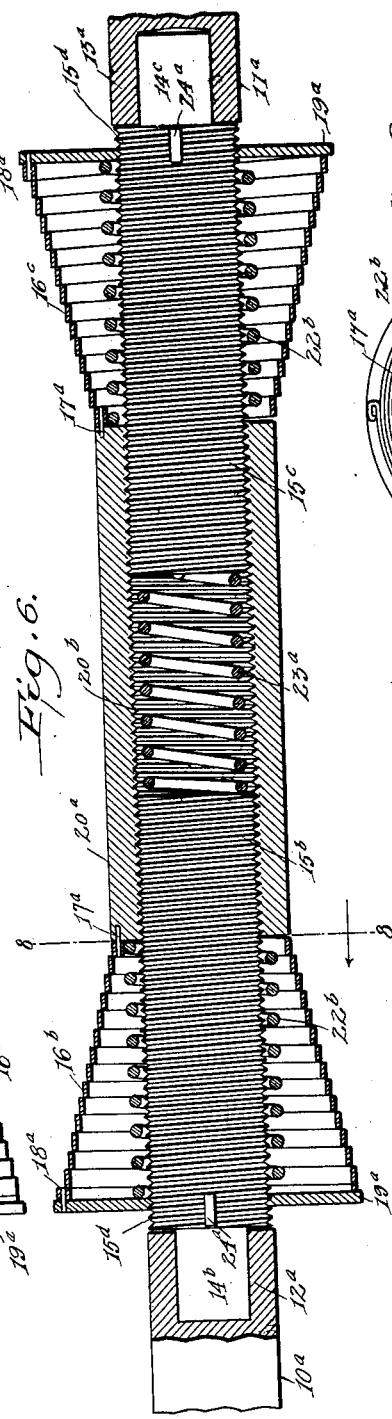
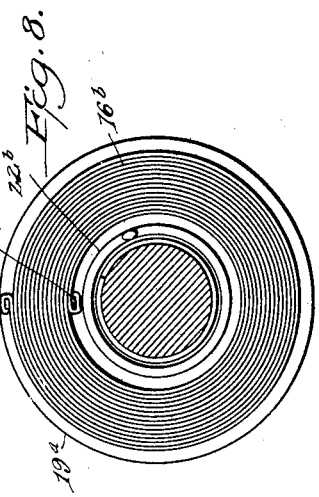
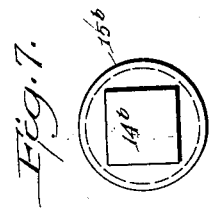
WITNESSES
INVENTOR
CLAUDE BEARENS
BY
ATTORNEYS

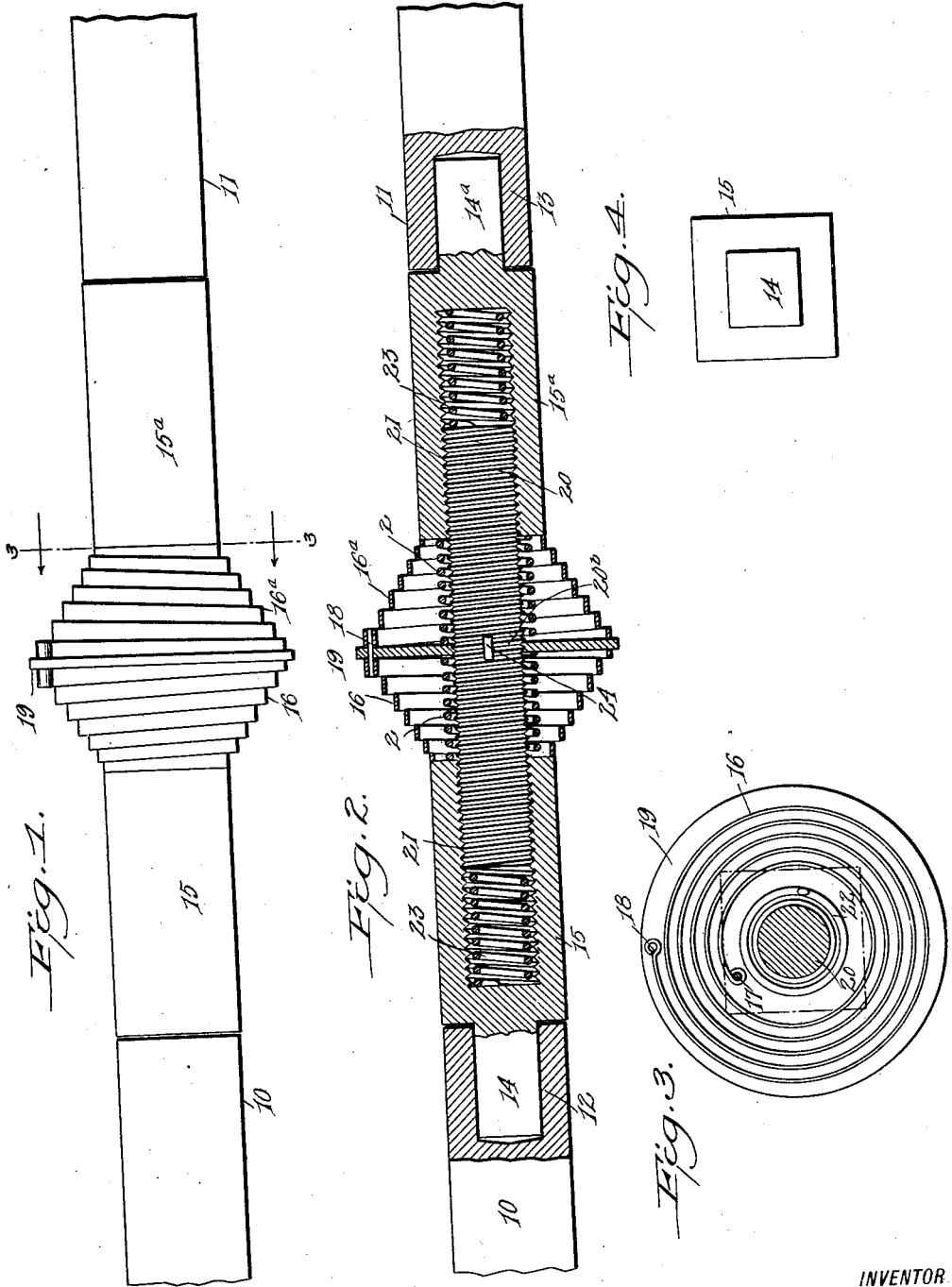

UNITED STATES PATENT OFFICE.

CLAUDE BEARENS, OF NEW YORK, N. Y.

RESILIENT DRIVE MEANS.

1,360,867.  Specification of Letters Patent.  Patented Nov. 30, 1920.

Application filed April 30, 1920. Serial No. 377,948.

*To all whom it may concern:*

Be it known that I, CLAUDE BEARENS, a citizen of the United States, and a resident of the city of New York, borough of Manhattan, in the county and State of New York, have invented a new and Improved Resilient Drive Means, of which the following is a description.

My invention relates to means to connect a drive element with a driven element as for example a drive shaft with a driven shaft, the invention being intended to have special advantage when interposed in the transmission means of a motor-driven vehicle.

The general object of the invention is to provide a resilient drive connection possessing distinctive features and advantages as will appear from the specific description following.

Reference is to be had to the accompanying drawings forming a part of this specification, it being understood that the drawings are merely illustrative of two examples of the invention.

Figure 1 is a side elevation of drive means embodying my invention;

Fig. 2 is a longitudinal section thereof;

Fig. 3 is a cross section on the line 3—3, Fig. 1;

Fig. 4 is an end view of one of two corresponding elements forming part of the drive means in the form shown in Figs. 1 and 2;

Fig. 5 is a side elevation of a drive means embodying my invention in another form;

Fig. 6 is a longitudinal section of the drive means shown in Fig. 5;

Fig. 7 is an end view of one of the alining members forming part of the drive means in the form shown in Figs. 5 and 6;

Fig. 8 is a cross section on the line 8—8, Fig. 6.

Referring more particularly to Figs. 1 to 4, the numeral 10 indicates a portion of a drive element, and 11 indicates a portion of a driven element, here shown as shaft sections, said shafts having each an axial recess or blind bores 12 and 13, respectively, the walls of which are square or otherwise made non-circular. Fitting slidably in the bore 12 is the reduced end 14 of an element 15 of the general form of a shaft section, a corresponding reduced end 14ª of an element 15ª fitting the recess 13 of the driven shaft 11. By reason of the non-circular cross section of the ends 14, 14ª and their recesses 12, 13, a turning movement of drive shaft 10 will be imparted to the element 15 and a turning movement imparted to the element 15ª will in turn be imparted to the driven shafts 11.

The adjacent ends of the elements 15, 15ª are connected through the medium of torsion springs 16, 16ª as follows: Said springs are of helical form and advantageously, of flat spring metal. The smaller end of the spring 16 is secured as at 17 in any suitable manner to the adjacent end of the element 15 and the opposite end of said spring and the corresponding end of the adjacent spring 16ª are suitably secured as by a pin 18 to a disk 19 disposed between the said springs. The smaller end of the spring 16ª is secured to the adjacent end of the element 15ª.

By the described construction a turning of the drive shaft 10 will impart a corresponding turning movement to the element 15 which in turn will stress the spring 16. As the tension of the spring 16 increases a turning movement will be imparted to the disk 19 which will stress the spring 16ª until the resistance of the shaft 11 is overcome, whereupon the spring 16ª will turn the element 15ª and said driven shaft. Thus, the driven shaft 11 will be started without shock. The described connection between the elements 15, 15ª and the drive and driven shafts permits of a relative sliding movement to compensate for the lengthening or shortening of the springs 16, 16ª when stressed or relaxed.

In the preferred forms of my invention I provide means to maintain the elements 15, 15ª in alinement. In the form shown in Figs. 1 to 3, said alining means consists of a screw shaft section 20 to which the disk 19 is threaded, said shaft engaging at its ends with threaded axial bores 21, 22 in the opposed ends of the elements 15, 15ª. Thus, as said elements 15, 15ª are turned relatively to the springs 16, 16ª, a longitudinal movement of the elements 15, 15ª relatively to the alining shaft section 20 is permitted due to the threaded engagement therebetween.

In order to provide additional cushioning means in the drive connection, springs 22, 22ª are coiled about the alining shaft section 20 at opposite sides of the disk 19 and abut respectively against said disk and against the ends of the elements 15, 15ª. Additional compression springs 23 may be provided in the threaded bores 21 to abut against the respective ends of the shaft sections 20 and the end walls of said recesses.

In the form shown in Figs. 5 to 8, the modified drive means between the drive shaft 10$^a$ and driven shaft 11$^a$ is arranged as follows: A threaded shaft section 15$^b$ has a reduced end 14$^b$ fitting an axial recess 12$^a$ in shaft 10$^a$ and a corresponding threaded shaft section 15$^c$ has a reduced end 14$^c$ fitting the non-circular recess 13$^a$ of shaft 11$^a$. A sleeve 20$^a$ having a threaded bore 20$^b$ receives and has threaded engagement with the opposed ends of the shaft sections 15$^b$, 15$^c$, and helical torsion springs 16$^b$, 16$^c$ are disposed at the ends of the sleeve 20$^a$, the smaller ends of said springs being secured as at 17$^a$ to said sleeve, while the larger ends of said springs are suitably secured as at 18$^a$ respectively to disks 19$^a$, 19$^b$ on the shaft sections adjacent to the respective drive and driven shafts 10$^a$, 11$^a$. A coiled compression spring 23$^a$ is disposed within the sleeve 20$^a$ between the ends of the shaft sections 15$^b$, 15$^c$ for cushioning relative longitudinal movement thereof. Also, compression springs 22$^b$ are provided, coiled respectively about the shaft sections 15$^b$, 15$^c$, within the springs 16$^b$, 16$^c$, and abutting respectively against the disks 19$^a$ and the ends of the sleeve 20$^a$. The respective disks 19, 19$^a$ are made fast in any suitable manner to the elements on which they are mounted as for example through the medium of a key and keyway as indicated at 24, Fig. 2, and 24$^a$, Fig. 6. Thereby, the turning of disk 19 turns the shaft section 20 and by reason of the threaded engagement of said shaft section with the elements 15, 15$^a$, the latter are moved longitudinally relatively to the shafts 10, 11. Similarly, the turning of the disks 19$^a$ turns the shaft sections 15$^b$, 15$^c$, causing the latter to move toward or from each other in the sleeve 20$^a$ and relatively to the shafts 10$^a$, 11$^a$. Making the elements 19, 19$^a$ in disk form is advantageous in affording a firm seat for the adjacent ends of the torsion springs (16, 16$^a$, 16$^b$, 16$^c$) and in their capacity as a connection between the torsion springs and the element 20$^a$ or shaft sections 15$^b$, 15$^c$, each disk constitutes an arm connecting the spring with the element (20, 15$^b$, 15$^c$) on which the disk is mounted.

By forming a threaded connection between the section 20 and the elements 15, 15$^a$ and also employing threads on the elements 15$^a$, 15$^c$ and 20$^a$, there is less liability of play between the parts while insuring the necessary relative longitudinal movement of the parts to compensate for the lengthening and shortening of the torsion springs.

I would state in conclusion that while the illustrated example constitutes a practical embodiment of my invention, I do not limit myself strictly to the mechanical details herein illustrated, since manifestly the same can be considerably varied without departure from the spirit of the invention as defined in the appended claims.

Having thus described my invention, I claim:

1. A resilient drive means adapted to be interposed between a drive and a driven element and including an element having means to connect the same with the drive element to be turned by the latter and to have longitudinal movement relatively to the drive element, a coil spring, means connecting said spring at one end with said third-mentioned element, turnable means to which the opposite end of said spring is connected, a second spring connected at one end with said turnable means, and a driven transmission element connected with the opposite end of the second spring.

2. A resilient drive means adapted to be interposed between a drive and a driven element and including an element having means to connect the same with the drive element to be turned thereby and to have longitudinal movement relatively thereto, a torsion spring connected at one end with said third-mentioned element, a revoluble element with which the other end of said torsion spring is connected, a second torsion spring connecting with one end of said revoluble element, and an element with which the opposite end of said second-mentioned torsion spring is connected, said last mentioned element having means to connect the same with the driven element to turn the latter and to have longitudinal movement relatively thereto.

3. A resilient drive means adapted to be interposed between a drive and a driven element to connect the same, said means including transmission elements respectively adapted to slidably and non-turnably engage the drive and driven elements, torsion springs disposed between said transmission elements, one end of each spring being connected with one end of the latter elements, and turnable means forming a connection between said springs, said turnable means being connected with both of said transmission elements to have turning and longitudinal movements relatively thereto.

4. A resilient drive means adapted to be interposed between a drive and a driven element to connect the same, said means including transmission elements respectively adapted to slidably and non-turnably engage the drive and driven elements, torsion springs disposed between said transmission elements, one end of each spring being connected with one end of the latter elements, and turnable means forming a connection between said springs, said turnable means having a threaded connection with both of said transmission elements.

5. A resilient drive means adapted to be interposed between a drive and a driven element to connect the same and including transmission elements respectively adapted to slidably and non-turnably engage the drive and driven elements, a revoluble element having threaded engagement with both of said transmission elements to form a connection therebetween and aline the same, a pair of torsion springs, means connecting one end of one of said springs with one of said transmission elements, means connecting one end of the other spring with the other of said transmission elements, and means to connect the opposite ends of said springs with that element having threaded connection with the transmission elements.

6. A resilient drive means adapted to be interposed between a drive and a driven element to connect the same and including transmission elements respectively adapted to slidably and non-turnably engage the drive and driven elements, a revoluble element having threaded engagement with both of said transmission elements to form a connection therebetween and aline the same, a pair of torsion springs, means connecting one end of one of said springs with one of said transmission elements, means connecting one end of the other spring with the other of said transmission elements, and means to connect the opposite ends of said springs with that element having threaded connection with the transmission elements; together with spring means to cushion the longitudinal movement of said transmission elements.

7. A resilient drive means adapted to be interposed between a drive and a driven element to connect the same, and including transmission elements respectively adapted to slidably and non-turnably engage the drive and driven elements, torsion springs interposed between said transmission elements, a threaded element having engagement respectively at its opposite ends with said transmission elements, and means connecting said threaded element with the ends of said springs opposite the first-mentioned ends.

8. A resilient drive means adapted to be interposed between a drive and a driven element to connect the same, said means including externally threaded transmission elements respectively adapted to slidably and non-turnably engage the drive and driven elements, a sleeve having internal threads and engaged at its respective ends by the threads of said transmission elements, and torsion springs at the ends of said internally threaded element and connected at their adjacent ends thereto, the opposite ends of said springs having connection respectively with the respective transmission elements.

CLAUDE BEARENS.